United States Patent

[11] 3,609,485

| [72] | Inventor | Frank Dostal |
| | | Elmhurst, N.Y. |
| [21] | Appl. No. | 814,649 |
| [22] | Filed | Apr. 9, 1969 |
| [45] | Patented | Sept. 28, 1971 |
| [73] | Assignee | Bulova Watch Company, Inc. |
| | | New York, N.Y. |

[54] RESONANT TORSIONAL OSCILLATORS
6 Claims, 5 Drawing Figs.

[52] U.S. Cl............................................. 318/132,
310/36, 250/232
[51] Int. Cl. .......................................... H02k 33/12
[50] Field of Search............................................. 331/154,
116, 116 M, 156; 310/21, 22, 25, 29, 36-39;
58/23, 23 TF, 23 AD, 23 FS, 23 A; 318/124-134;
250/232; 356/714; 350/266, 271

[56] References Cited
UNITED STATES PATENTS

| 2,410,317 | 10/1946 | Tolson | 310/36 X |
| 2,463,785 | 3/1949 | Lubcke | 310/36 |
| 3,176,171 | 3/1965 | Baumgartner | 310/36 X |
| 3,192,488 | 6/1965 | Faith et al. | 331/154 |
| 3,277,394 | 10/1966 | Holt et al. | 318/132 X |
| 3,351,788 | 11/1967 | Faure | 310/22 |

*Primary Examiner*—D. F. Duggan
*Attorney*—Michael Ebert

ABSTRACT: A resonant torsional oscillator adapted to serve as an optical chopper or to provide other useful functions which require a vibratory action at a high amplitude and a constant rate. The oscillator is constituted by an erect torsional rod whose base is anchored, an optical element being attached to the free end of the rod. The rod is sustained in torsional vibration by means of an electromagnetically driven armature secured to the rod, the point of attachment being adjacent the base whereby the torsional swing at the free end of the rod is amplified with respect to that at said point.

PATENTED SEP 28 1971 3,609,485
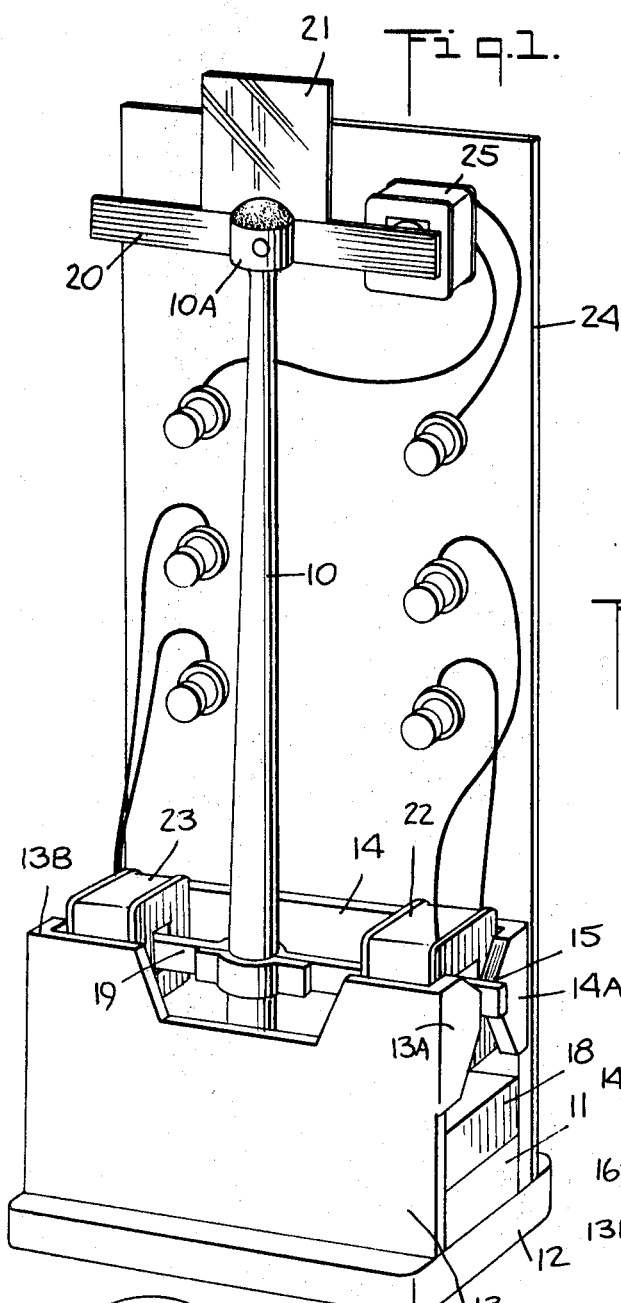
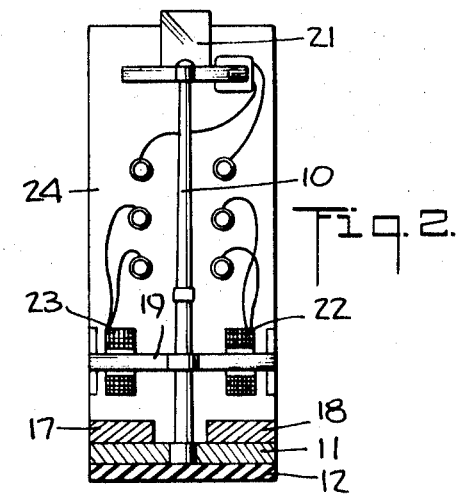
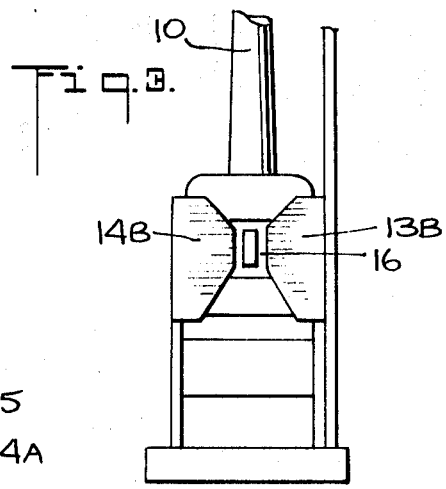
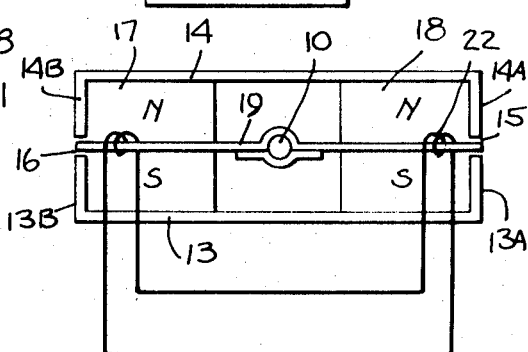
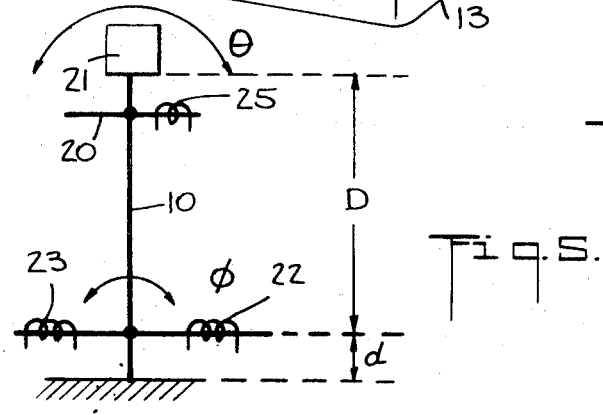
INVENTOR.
FRANK DOSTAL
BY Michael Ebert
ATTORNEY

RESONANT TORSIONAL OSCILLATORS

RELATED APPLICATION

This application is related to my copending application Ser. No. 730,425, filed May 20, 1968, entitled "Resonant Torsional Oscillators."

This invention relates generally to resonant electromechanical oscillators, and more particularly to a compact, light weight and low-power torsional oscillator which is adapted to provided a vibratory action of high amplitude at a constant rate.

Various forms of optical devices are currently in use to chop, modulate, pulse, scan, sweep or otherwise control a light beam or other beams of radiant energy. Such devices are incorporated in mass spectrometers, bolometers, star trackers, colorimeters, horizon sensors and in various instruments which utilize or analyze ion, nuclear, X-ray, laser beams or beams in the visible, ultraviolet or infrared region.

Existing optical devices for this purpose usually make use of motor-driven discs, drums, mirrors or prisms. Devices using motors are relatively big and heavy and have large power requirements, particularly at higher frequencies, thus necessitating extra size and weight provisions for inverters ro similar power supplies. Also in use are electromechanically actuated armature devices in which the pivoted armature is mounted in jeweled bearings. Optical modulators of these types are relatively inefficient and unstable, they are lacking in shock resistance and have other drawbacks which limit their usefulness.

It is also known to use resonant tuning forks to vibrate optical elements and while such forks overcome many of the drawbacks found in motor driven choppers, they are comparatively expensive and are unable to produce large angular excursions of the optical elements when operated at low power.

In my above-identified copending application there is disclosed a torsional oscillator which obviates many of the disadvantages of resonant tuning forks for vibrating optical elements, the oscillator being constituted by a flat torsional spring suspended between end supports and having crossarms extending outwardly from its center. These arms are secured to an armature having magnetic pole pieces at either end, the pole pieces being associated with fixed coils whereby when the oscillator is activated, the armature seesaws about the axis of the spring at a constant rate which is determined by the moments of the armature and the arms secured thereto as well as the elastic properties of the spring.

A torsional oscillator of the type disclosed in my copending application is highly efficient in the low frequency range. But at frequencies beyond approximately 1,000 Hz., it becomes difficult to produce large angles of deflection or swing as is necessary in certain optical systems.

Accordingly, it is the main object of the invention to provide a torsional oscillator which is capable of operating in a relatively high frequency range at a constant rate to produce a vibratory action of high amplitude.

More specifically, it is an object of this invention to provide a torsional oscillator in which an erect torsion rod anchored at the base is electromagnetically driven at a point adjacent the base to cause an optical element attached to the free end of the rod to swing back and forth with an amplitude which is proportional to the length of the rod.

Also an object of the invention is to provide a highly efficient resonant torsional oscillator of the above type which is of compact, lightweight design, which has low power requirements and which is especially adapted for use in space-operated vehicles and in other installations where weight and equipment space are at a premium.

A significant aspect of the invention is that the torsional oscillator is relatively insensitive to shock forces which may arise in hostile environments, the oscillator having a prolonged operating life, there being no need for lubrication or other care, operating wear being almost nonexistent, and reliability being of a high order. While the invention will be described in conjunction with an optical scanner, it is to be understood that it is also useful whenever there is need for a vibratory action at a constant rate and at high amplitude.

Briefly stated these objects are attained in a torsional oscillator having an erect torsional rod anchored to a base, an optical element being attached to the free end thereof. The rod is sustained in torsional vibration by means of an armature secured to the rod at a point adjacent the base, the armature being electromagnetically driven by an electronic drive system. Inasmuch as the ratio of the angular swing at the free end of the rod to the angular swing at the drive point depends on relative distance between the drive point and the free end and the drive point and the base, the torsional swing and hence the deflection of the optical element at the free end is greatly amplified with respect to the torsional swing at the drive point.

For a better understanding of the invention as well as other objects and further features thereof, reference is made to the following detailed description to be read in conjunction with the accompanying drawing, wherein:

FIG. 1 is a perspective view of one preferred embodiment of a torsional oscillator in accordance with the invention;

FIG. 2 is a sectional view of the light scanner;

FIG. 3 is a side view of the light scanner;

FIG. 4 schematically shows the magnetic and electronic circuit arrangement of the oscillator; and FIG. 5 schematically illustrated how the swing of the torsional rod is amplified.

Referring now to the drawings, and more particularly to FIGS. 1 to 4, there is shown a torsional oscillator in accordance with the invention, the oscillator being adapted to function as an optical chopper to modulate, pulse, scan, sweep or otherwise control a beam of radiant energy impinging on the optical element being vibrated by the oscillator.

The oscillator comprises an erect torsion rod 10 whose lower end is anchored in a metal base plate 11 which in turn is mounted on an insulating mounting plate 12. Secured to the long sides of the base plate are a pair of upright frame elements 13 and 14 made of material such as iron having soft magnetic properties. The ends of these elements are provided with bent in tabs 13A, 13B, 14A and 14B, which act as pole pieces and define magnetic airgaps, only one of which (15) is visible in FIG. 1, the other gap 16 being shown in FIG. 3.

Nesting between frame elements 13 and 14 adjacent the airgaps are a pair of permanent magnet slabs 17 and 18, the ends of the slabs making contact with the elements and thereby polarizing the tabs in the manner shown in FIG. 4. Thus tabs 13A and 13B are magnetically south and north respectively, as are tabs 14A and 14B, to provide lines of magnetic flux across the gaps 15 and 16.

Mounted transversely on rod 10 and symmetrically positioned thereon is a soft-iron drive armature 19, the ends of the armature being disposed within airgaps 15 and 16. The armature is disposed at a point adjacent the base of the rod. Similarly mounted on masthead 10A at the free end of rod 10 is a second and shorter armature 20, this armature being in the same vertical plane as the lower armature.

Mounted above masthead 10 is a reflecting mirror 21 which when the structure is in operation rotates back and forth about the longitudinal axis of rod 10, thereby periodically deflecting a light beam or other beam of radiant energy incident thereto at a rate determined by the resonance characteristics of the oscillator to provide a scanning or chopping action. The nature of the optical element forms no part of the present invention.

Surrounding one end of armature 19 is a first drive coil 22 which is cemented or otherwise attached to tabs 13A and 14A, and surrounding the other end of the armature 19 is a second drive coil 23 attached to tabs 13B and 14B. Mounted on a backboard 24 is a pickup electromagnet 25 adjacent one end of the upper armature 20, the electromagnet consisting of a coil surrounding a magnetic core.

The operation of the oscillator can best be understood in connection with FIG. 4 where it will be seen that the pickup electromagnet coil 25 is connected to the input of an amplifier 26 whose output is coupled to drive coils 22 and 23. It will be seen that the magnetic pole pieces formed by tabs 13A and 14A and by tabs 13B and 14B are polarized by the permanent magnets, so that tabs 13A and 13B are both south and tabs 14A and 14B are both north. Assuming that a positive-going pulse is applied to drive coils 22 and 23, the armature 19 becomes polarized so that one end in airgap 15 is then south, and the other end in airgap 16 is north. Consequently, in gap 15 the armature end is attracted to the north side and in gap 16 to the south side, thereby producing a clockwise force on torsion rod 10. If, on the other hand, the pulse is negative going, the force produced would be counterclockwise, but in either case, the rod is subjected to a torsional force.

The resonance frequency of the torsional oscillator is determined by the moments of armatures 19 and 20 and reflector 21 as well as the dimensions and Youngs' modulus of the rod. To minimize the effect of temperature on the rod dimensions, the rod may be made of an alloy whose elasticity and length are substantially uneffected by changes in temperature within a broad range. An example of such material is Ni-Span C. Other suitable alloys are Bulalloy, Elinvar and beryllium-copper.

The torsional movement of the rod at its resonance frequency causes the upper armature 20 to swing at the same rate, thereby generating a signal voltage representing the mechanical resonance frequency of the torsional rod and the moment of the device attached thereto. This voltage is applied to amplifier 26, which in practice may be a single or multistage solid-state type. The amplifier output is applied to the drive coils. The coils are armatures and the related mechanically resonant structure becomes, in effect, the positive feedback element of an oscillator. Since maximum transmission occurs at resonance the system will oscillate at this frequency. The operation is thus similar to that used in electronically maintained tuning fork oscillators.

It is not essential that two drive coils be used, and in a low-cost version of the oscillator, one may use a single armature 19, with a single drive coil at one end and a pick up coil at the other. This is not as efficient as the embodiment disclosed herein, but may be adequate in some applications.

In order to obtain a large swing of the mirror, it is essential that the torsional swing at the masthead be large. If the driving force were applied to an armature adjacent the masthead, it would be necessary to have a relatively large airgap to allow for the movement of the armature. But a large airgap would not provide a high magnetic flux density and this arrangement would be inefficient and even impossible.

In the present invention, the driving armature 19 is adjacent the base of the rod and operates within relatively narrow gaps providing a high flux density. The displacement of the drive armature is relatively small, yet the swing of the masthead is quite large because of the mechanical amplification inherent in the structure.

As shown in FIG. 5, the value $d$ represents the short distance between the point of attachment of drive armature 19 and the base, and the value D the long distance between this point ad masthead 10A. The angle $\Phi$ represents the angular swing of the rod at the armature position and the angle $\theta$ the angular swing of the masthead. Since $\theta/\Phi = D/d$, it will be evident the larger of greater the difference between $d$ and D, the larger the angle of $\theta$ as compared to angle $\Phi$. Hence by placing the armature near the base, it becomes possible to drive the rod with a relatively small swing and yet obtain the desired large swing of the mirror on the masthead.

Higher frequencies are obtained by exciting a higher mode in the torsion rod. In this higher mode, a node develops in the middle region of the rod, and the pickup armature operates out of phase with the drive armature. Typical mirror displacements are 10° peak to peak at 2,000 Hz. 3° at 10,000 Hz.

While there has been shown and described a preferred embodiment of the invention, it will be appreciated that many changes and modifications may be made therein without, however, departing from the essential spirit of the invention.

What I claim is:

1. A torsional oscillator comprising
   a. an erect torsional rod anchored at its base,
   b. an optical element mounted on the masthead of the rod and swinging therewith,
   c. an armature secured transversely to the rod at a point thereon adjacent the base, the distance between said point and said base being short and the distance between said point and said masthead being relatively long,
   d. a magnetic circuit including an airgap which is relatively narrow to provide high flux density, one end of said armature being positioned within said airgap,
   e. a fixedly positioned drive coil surrounding said end of said armature, and
   f. means to apply periodic drive pulses to said coil at a rate corresponding to the resonance frequency of the rod to polarize said armature and thereby effect displacement thereof within said airgap, said armature applying a periodic torsional force to said rod, thereby causing said masthead to swing to an extent which is greater than the swing of said point and which depends on the length of the rod.

2. An oscillator as set forth in claim 1, further including a second magnetic circuit at the other end of the armature and a second drive coil associated therewith.

3. An oscillator as set forth in claim 1, further including a second armature secured transversely to said rod adjacent said armature, and a pickup electromagnet associated with one end of said second armature, said electromagnet having voltage pulses induced therein which are amplified and applied to said drive coil.

4. An oscillator as set forth in claim 1, wherein said rod is anchored on a base plate and said magnetic circuit is formed b a pair of soft-iron frame elements mounted vertically along the long sides of said plate, said elements having a pair of bent-in end tabs forming said airgap, and a permanent magnet slab disposed between said element in contact therewith.

5. An oscillator as set forth in claim 4, wherein said drive coil is mounted on said tabs.

6. An oscillator as set forth in claim 1, wherein said rod is made of an alloy substantially insensitive to changes in temperature.